United States Patent Office 3,696,095
Patented Oct. 3, 1972

3,696,095
(1,3) OXAZINO (3,2-d) (1,4) BENZODIAZEPINE DERIVATIVES AND PROCESS FOR THE PREPARATION THEREOF
Joseph Hellerbach, 140 Gundeldingerrain, and Andre Szente, 157 Riehenstrasse, both of Basel, Switzerland
No Drawing. Filed Sept. 9, 1971, Ser. No. 179,228
Claims priority, application Switzerland, Sept. 25, 1970, 14,263/70
Int. Cl. C07d 53/06, 87/20, 87/54
U.S. Cl. 260—239.3 T
16 Claims

ABSTRACT OF THE DISCLOSURE

Novel [1,3]oxazino[3,2-d][1,4]benzodiazepine derivatives and processes for their preparation are disclosed. These benzodiazepine derivatives are useful as sedative, anti-convulsant and muscle relaxant agents.

DETAILED DESCRIPTION OF THE INVENTION

The present invention relates to tricyclic benzodiazepines. More particularly, this invention concerns novel [1,3]oxazino [3,2-d][1,4]benzodiazepine derivatives and processes for making these novel benzodiazepines.

The compounds of the present invention are selected from the group consisting of compounds of the formula

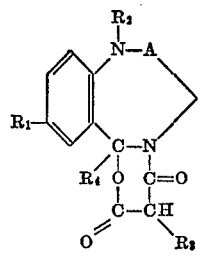

wherein
$R_1$ signifies hydrogen, halogen, nitro, trifluoromethyl, cyano, amino, lower alkanoyl, or lower alkyl containing from 2 to 4 carbon atoms;
$R_2$ signifies hydrogen, lower alkyl, lower alkoxy-lower alkyl, cycloalkyl-lower alkyl wherein the cycloalkyl moiety contains from 3 to 6 carbon atoms, or di-lower alkylamino-lower alkyl;
$R_3$ signifies hydrogen or lower alkyl;
$R_4$ signifies pyridyl, phenyl, mono-halophenyl or di-halophenyl;
X signifies —CO— or —CH$_2$—
and the pharmaceutically acceptable acid addition salts thereof.

As used herein, the term "lower alkyl," either alone or in combination as in di-lower alkylamino-lower alkyl, refers to straight and branched chain hydrocarbon groups containing from 1 to 7, preferably from 1–4 carbon atoms, such as, for example, methyl, ethyl, propyl, isopropyl, butyl, isobutyl, t-butyl and the like. The term "lower alkanoyl" denotes an acyl group derived from an aliphatic carboxylic acid containing at most 4 carbon atoms, such as acetyl, propionyl and the like. The term "lower alkoxy" designates straight or branched chain saturated hydrocarbonoxy groups containing from 1 to 7, preferably from 1 to 4 carbon atoms, such as methoxy, ethoxy, propoxy and the like. The term "cycloalkyl-lower alkyl" refers to groups such as cyclopropylmethyl, cyclobutyl-ethyl and the like. The term "halogen" refers to all four forms thereof, i.e. bromine, chlorine, fluorine and iodine.

A preferred class of compounds falling within the scope of Formula I above are those wherein $R_1$ signifies halogen or nitro, $R_2$ and $R_3$ each represent hydrogen or lower alkyl and $R_4$ represents phenyl or halophenyl, i.e. compounds of the formula

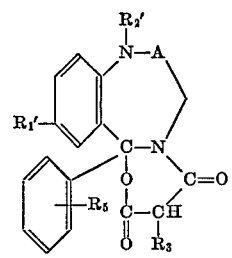

wherein
$R_1'$ signifies halogen or nitro;
$R_2'$ signifies hydrogen or lower alkyl;
$R_5$ signifies hydrogen or halogen;
$R_3$ and A are as defined above and the pharmaceutically acceptable acid addition salts thereof.

Particularly preferred among the compounds of Formula I are those wherein $R_2$ represents hydrogen or lower alkyl, preferably methyl, $R_3$ represents hydrogen or lower alkyl, preferably ethyl, and $R_4$ represents a halophenyl group, preferably an ortho-halophenyl group, most preferably the ortho-fluorophenyl or ortho-chlorophenyl group.

In other preferred aspects, when the $R_1$ substituent is a lower alkyl group, the ethyl group is preferred; where the $R_1$ substituent is a lower alkanoyl group, the acetyl group is preferred; when the $R_1$ substituent is halogen and the $R_4$ substituent is phenyl or a substituted phenyl group, chlorine or iodine are preferred; whereas when $R_1$ is halogen and $R_4$ is pyridyl, bromine is preferred. The $R_2$ substituent is preferably hydrogen, lower alkyl, cycloalkyl-lower alkyl, preferably cyclopropyl-methyl, or di-lower alkyl amino-lower alkyl, preferably di-ethylaminoethyl. When $R_2$ represents a lower alkoxy-lower alkyl group, methoxymethyl is preferred. $R_4$ preferably represents phenyl, ortho-halophenyl, most preferably ortho-fluorophenyl or ortho-chlorophenyl, 2,6-dihalophenyl, especially 2,6-difluorophenyl, or 2-pyridyl.

Most preferred of the compounds of Formula I are:
11-chloro-12b-(o-fluorophenyl)-8,12b-dihydro-8-methyl-2H-[1,3]oxazino[3,2-d][1,4]benzodiazepine-2,4,7(3H, 6H)-trione,
3-ethyl-11-chloro-12b-(o-chlorophenyl)-8,12b-dihydro-8-methyl-2H-[1,3]oxazino[3,2-d][1,4]benzodiazepine-2,4,7(3H,6H)-trione, and
3-ethyl-11-chloro-12b-(o-fluorophenyl)-8,12b-dihydro-8-methyl-2H-[1,3]oxazino[3,2-d][1,4]benzodiazepine-2,4,7,(3H,6H)-trione.

The compounds of Formula I above may be prepared by reacting a compound of the general formula

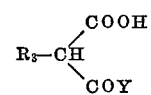

wherein
$R_3$ is as described above and
COY represents a carboxyl group or a functionally modified carboxyl group with a compound of the general formula

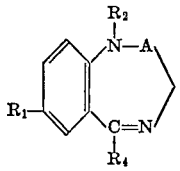

III wherein $R_1$, $R_2$, $R_4$ and A are as described above.

The compounds of Formulae II and IIII above used as the starting materials for this process aspect are known compounds or can be prepared in analogy to the procedures employed in the preparation of the known compounds.

Representative of the starting materials of Formula II that can be employed in this process are malonic acid, malonic acid substituted by a lower alkyl group, such as methyl-malonic acid, ethylmalonic acid and the like, or a corresponding reactive malonic acid derivative wherein one of the two carboxyl groups is functionaly modified, for example, to an acid halide or ester group.

The reaction of a compound of Formula II with a compound of Formula III is effected with the elimination of HY, that is to say, with the loss of water when a free dicarboxylic acid of Formula II is used, with loss of the corresponding alcohol component when a corresponding half-ester is used, with the loss of hydrogen halide when a corresponding half-halide is used, etc. The reaction can be carried out under thermal conditions; for example, by heating in an inert organic solvent of sufficiently high boiling point; especially in a solvent with which the eliminated compound HY can be continuously removed from the reaction mixture by azeotropic distillation. Examples of suitable solvents include aromatic hydrocarbons such as xylene, halogenated aromatic hydrocarbons such as chlorobenzene, chlorotoluene and the like. It is preferable to carry out the reaction at the reflux temperature of the reaction mixture. The reaction of a compound of Formula II with a compound of Formula II can also be carried out by heating in the absence of a solvent; for example, by fusion of the reaction components. In this latter procedure, the temperature should obviously not reach a point where decomposition of the starting materials and/or end-products occurs. It is thus in many instances preferable to facilitate the elimination of HY by carrying out the reaction under reduced pressure.

If a free dicarboxylic acid such as malonic acid, methylmalonic acid, ethylmalonic acid and the like is used as the starting material of Formula II, the reaction can be carried out in the presence of a suitable dehydrating agent, in which case thermal reaction conditions are not necessary. Suitable dehydrating agents for this procedure are, for example, acid anhydrides such as acetic anhydride and the like. This procedure can, for example, be carried out by dissolving the reaction components in acetic acid anhydride and allowing the mixture (if necessary after heating for a short time on a water-bath) to stand at room temperature for a prolonged time. However, the reaction can also be effected in the presence of an inert organic solvent.

The compounds of Formula I above which are basic in nature form pharmaceutically acceptable acid addition salts. Thus the compounds of this invention form pharmaceutically acceptable acid addition salts with inorganic and organic acids; i.e. the hydrohalic acids such as hydrochloric acid and hydrobromic acid; and with organic acids such as fumaric acid, succinic acid, maleic acid, methanesulfonic acid and the like.

The compounds of Formula I, as well as their pharmaceutically acceptable acid addition salts, are useful as anticonvulsants, muscle relaxants and sedatives. Thus these compounds and their pharmaceutically acceptable salts can be used as medicaments. For example, they can be used in the form of pharmaceutical preparations which contain them or their salts in admixture with a compatible pharmaceutical carrier. This carrier can be an organic or inorganic inert carrier material which is suitable for enteral, percutaneous or parenteral administration such as, for example, water, gelatin, gum arabic, lactose, starches, magnesium stearate, talc, vegetable oils, polyalkylene glycols, petroleum jelly, etc. The pharmaceutical preparations can be made up in solid form (e.g. as tablets, dragées, suppositories or capsules) or in liquid form (e.g. as solutions, suspensions or emulsions). They may be sterilized and/or may contain adjuvants such as preserving, stabilizing, wetting or emulsifying agents, salts for varying the osmotic pressure or buffers. They can also contain yet other therapeutically valuable substances. The dosage follows individual requirements, but a dosage of 0.1–5 mg./kg./day is preferred.

The useful anti-convulsant activity of the compounds of this invention is shown in warm-blooded animals utilizing the standard penta-methylenetetrazole test. This test was carried out using mice as the test animal according to the method of Orloff (Proc. Soc. Exptl. Biol. Med., 70, 254–257, 1949). 11-cloro - 12b - (o-fluorophenyl)-8,12b-dihydro - 8 - methyl-2H-[1,3]oxazine[3,2-d][1,4]benzodiazepin - 2,4,7(3H,6H)-trione which displays an $LD_{50}$ of greater than 5000 mg./kg. p.o. exhibits an APR 2.0 of 17 mg./kg. p.o. [by APR 2.0 there is meant that dosage in mg./kg. of an anticonvulsant which brings about double the pentetrazole consumption as compared to an untreated control group]. In the same test, 3-ethyl-11-chloro-12b-(o-chlorophenyl)-8,12b-dihydro - 8 - methyl-2H - [1,3]oxazino[3,2-d][1,4]benzodiazepine - 2,4,7(3H,6H)-trione [$LD_{50}$ greater than 5000 mg./kg. p.o.] exhibits an APR 2.0 between 0.8 and 1.3 mg./kg. p.o. and 3-ethyl - 11 - chloro-12b-(o-fluorophenyl)-8,12b-dihydro-8-methyl - 2H - [1,3]oxazino[3,2-d][1,4]benzodiazepine-2,4,7(3H,6H) - trione [$LD_{50}$ greater than 5000 mg./kg. p.o.] exhibits an APR 2.0 of 13 mg./kg. p.o. The muscle relaxant activity can be demonstrated in the rotating rod test. For example, in this test 11-chloro - 12b - (o-fluorophenyl) - 8,12b - dihydro - 8 - methyl-2H-[1,3]oxazino [3,2-d][1,4]benzodiazepine - 2,4,7(3H,6H) - trione exhibits an $HD_{50}$ between 2 and 7 mg./kg. p.o. and 3-ethyl-11-chloro - 12b - (o-fluorophenyl) - 8,12b - dihydro-8-methyl - 2H - [1,3]oxazino[3,2 - d][1,4]benzodiazepine-2,4,7(3H,6H)-trione exhibits an $HD_{50}$ of 20 mg./kg. p.o.

The following examples further illustrate the invention.

EXAMPLE 1

5 g. of 7-chloro-1,3-dihydro - 1 methyl-5-phenyl-2H-1,4-benzodiazepin-2-one and 5 g. of malonic acid are dissolved in 50 ml. of acetic anhydride, the mixture is briefly heated on the water-bath and allowed to stand overnight at room temperature. The precipitated 11-chloro-8,12b dihydro - 8 - methyl-12b-phenyl-2H-[1,3] oxazino[3,2-d][1,4] - benzodiazepine - 2,4,7(3H,6H)-trione is filtered off, thoroughly washed with ether and dried in vacuum; melting point 172–173° (dec.).

EXAMPLE 2

According to the procedure described in Example 1, from 7-chloro - 5 - (o-fluorophenyl)-1,3-dihydro-1-methyl 2H-1,4-benzodiazepin-2-one and malonic acid in acetic anhydride there is obtained 11-chloro - 12b - (o-fluorophenyl)-8,12b-dihydro - 8 - methyl - 2H - [1,3]oxazino [3,2-d][1,4]benzodiazepine-2,4,7-(3H,6H) - trione which is recrystallized from methylene chloride/acetic ester/ether and then melts at 136–140° with decomposition.

EXAMPLE 3

According to the procedure described in Example 1, from 1,3-dihydro - 1 - methyl - 7 - nitro-5-phenyl-2H-1,4-benzodiazepin-2-one and malonic acid in acetic anhydride there is obtained 8,12b-dihydro - 8 - methyl-11-nitro-12b-phenyl - 2H - [1,3]oxazino[3,2 - d][1,4]benzodiazepine- 2,4,7-(3H,6H)-trione which is recrystallized from methylene chloride and then melts at 200° with decomposition.

EXAMPLE 4

13 g. of 7-chloro - 2,3 - -dihydro-1-methyl-5-phenyl-1H-2,4-benzodiazepine and 6.1 g. of ethylmalonic acid are dissolved in 50 ml. of acetic anhydride and the mixture is allowed to stand overnight at room temperature. The acetic anhydride is evaporated off in vacuum and the residue taken up in methylene chloride. The solution obtained is washed twice with aqueous sodium bicarbonate solution, dried over magnesium sulphate and evaporated. The 3-ethyl - 11 - chloro-6,7,8,12b-tetrahydro - 8 - methyl-12b-phenyl-2H-[1,3]oxazino[3,2-d][1,4]benzodiazepine - 2,4 (3H)-dione remaining as the residue is recrystallized from acetic ester and then melts at 151° with decomposition.

EXAMPLE 5

According to the procedure described in Example 4, from 7-chloro - 2,3 - dihydro - 1 - methyl-5-phenyl-1H-1,4-benzodiazepine and malonic acid in acetic anhydride there is obtained 11 - chloro - 6,7,8,12b - tetrahydro-8-methyl-12b-phenyl - 2H - [1,3]oxazino[3,2-d][1,4]benzodiazepine-2,4(3H) - dione which is recrystallized from methylene chloride/acetic ester and then melts at 157° with decomposition.

EXAMPLE 6

According to the procedure described in Example 4, from 7 - chloro-1,3-dihydro-5-phenyl-2H-1,4-benzodiazepin-2-one and ethylmalonic acid in acetic anhydride there is obtained 3-ethyl-11-chloro-8,12b-dihydro-12b-phenyl-2H - [1,3]oxazino[3,2-d][1,4]benzodiazepin - 2,4,7(3H, 6H)-trione which is crystallized from methylene chloride and then melts at 176° with decomposition.

EXAMPLE 7

According to the procedure described in Example 4, from 7-chloro-1,3-dihydro - 1 - methyl-5-phenyl-2H-1,4-benzodiazepin-2-one and ethylmalonic acid in acetic anhydride there is obtained 3-ethyl-11-chloro-8,12b-dihydro-8-methyl-12b-phenyl-2H-[1,3]oxazino[3,2-d][1,4]-benzodiazepine-2,4,7(3H,6H)-trione. The compound is chromatographed on silica gel with methylene chloride/acetic ester (10:1) and crystallized from ether and their melts at 170° with decomposition.

EXAMPLE 8

According to the procedure described in Example 4, from 1,3-dihydro-1-methyl-7-nitro-5-phenyl-2H-1,4-benzodiazepin-2-one and ethylmalonic acid in acetic anhydride there is obtained 3-ethyl-8,12b-dihydro-8-methyl-11-nitro-12b - phenyl-2H-[1,3]oxazino[3,2-d][1,4]benzodiazepine-2,4,7(3H,6H)-trione. The compound is chromatographed on silica gel with methylene chloride-acetic ester (10:1) and crystallized from ether and then melts at 210° with decomposition.

EXAMPLE 9

According to the procedure described in Example 4, from 7-chloro-5-(o - chlorophenyl)-1,3-dihydro-1-methyl-2H-1,4-benzodiazepin-2-one and ethylmalonic acid in acetic anhydride there is obtained 3-ethyl-11-chloro-12b-(o-chlorophenyl) - 8,12b - dihydro - 8 - methyl-2H-[1,3]oxazino[3,2 - d][1,4]benzodiazepine - 2,4,7(3H) - trione. The compound is chromatographed on silica gel with methylene chloride-acetic ester (10:1) and crystallized from ether and then melts at 148° with decomposition.

EXAMPLE 10

According to the procedure described in Example 4, from 7-chloro-5-(o - fluorophenyl)-1,3-dihydro-1-methyl-2H-1,4-benzodiazepin-2-one and ethylmalonic acid in acetic anhydride there is obtained 3-ethyl-11-chloro-12b-(o-fluorophenyl) - 8,12b - dihydro - 8 - methyl-2H-[1,3] oxazino[3,2 - d][1,4]benzodiazepine - 2,4,7(3H,6H) - trione. The compound is crystallized from ether and recrystallized from methylene chloride and then melts at 158–162° with decomposition.

EXAMPLE 11

Tablets of the following composition are manufactured:

| | Per tablet, mg. |
|---|---|
| 11-chloro-12b(o - fluorophenyl) - 8,12b - dihydro-8-methyl-2H-[1,3]oxazino[3,2 - d][1,4]-benzodiazepine-2,4,7(3H,6H)-trione | 10 |
| Corn starch | 53 |
| Lactose | 150 |
| Gelatin (10% solution) | 6 |

The active substance, the corn starch and the lactose are thickened with a 10% gelatin solution. The paste is comminuted, the granulate brought into a suitable pan and dried at 43°. The dried granulate is passed through a comminuting machine and mixed in a mixer with the following ingredients

| | Mg. |
|---|---|
| Talc | 6 |
| Magnesium stearate | 6 |
| Corn starch | 9 | and then compressed to tablets of 240 mg.

EXAMPLE 12

Suppositories are manufactured with the following ingredients:

| | Per 1 g. suppository |
|---|---|
| 11 - chloro - 12b - (o - fluorophenyl)-8,12b-dihydro - 8 - methyl-2H-[1,3]oxazino[3,2 - d][1,4]-benzodiazepine-2,4,7(3H,6H)-trione mg | 10.0 |
| Hydrogenated coconut oil mg | 975.0 |
| Carnauba wax mg | 15.0 |

The hydrogenated coconut oil and the carnauba wax are melted in a suitable vessel fitted with glass liner and cooled to 45°. The active substance is added with stirring and stirred until complete dispersion. The mixture is thereupon poured into suppository moulds which ensure a suppository weight of 1 g.

EXAMPLE 13

A parenteral use-form is manufactured with the following ingredients:

| | Per ml. |
|---|---|
| 11 - chloro - 12b - (o - fluorophenyl) - 8,12b - dihydro - 8 - methyl - 2H - [1,3]oxazino[3,2-d][1,4]-benzodiazepine-2,4,7(3H,6H)-trione mg | 5 |
| Dimethylacetamide percent | 10 |
| Propylene glycol do | 50 |
| Benzyl alcohol do | 1.5 |
| Ethanol do | 10 |
| Water for injection, ad ml | 1 |

The active substance is dissolved in dimethylacetamide and treated with benzyl alcohol, propylene glycol, ethanol and water. The solution is filtered through a candle filter, filled into suitable ampules, sealed and sterilized.

EXAMPLE 14

Tablets and suppositories and a parenteral use-form may be manufactured according to the procedures described in Examples 11–13 above with 3-ethyl-11-chloro-12b - (o-chlorophenyl) - 8,12b - dihydro - 8 - methyl-2H - [1,3] - oxazino[3,2-d][1,4]benzodiazepine - 2,4,7 (3H,6H) - trione or 3-ethyl-11-chloro-12b-(o-fluorophenyl) - 8,12b - dihydro - 8 - methyl - 2H - [1,3]oxazino [3,2-d][1,4]benzodiazepine - 2,4,7 (3H,6H) - trione being used as the active substance.

We claim:
1. A compound of the formula

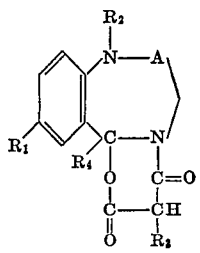

wherein
$R_1$ signifies hydrogen, halogen, nitro, trifluoromethyl, cyano, amino, lower alkanoyl, or lower alkyl containing from 2 to 4 carbon atoms;
$R_2$ signifies hydrogen, lower alkyl, lower alkoxy-lower alkyl, cycloalkyl-lower alkyl wherein the cycloalkyl moiety contains from 3 to 6 carbon atoms, or di-lower alkylamino-lower alkyl;
$R_3$ signifies hydrogen or lower alkyl;
$R_4$ signifies pyridyl, phenyl, mono-halophenyl or di-halophenyl;
X signifies —CO— or —CH$_2$—
and the pharmaceutically acceptable acid addition salts thereof.

2. A compound of claim 1 wherein $R_2$ signifies hydrogen, lower alkyl, cycloalkyl-lower alkyl, or di-lower alkylamino-lower alkyl.

3. A compound of claim 1 wherein $R_1$ signifies ethyl, acetyl, chlorine or iodine or, when $R_4$ signifies a 2-pyridyl group, bromine.

4. A compound of claim 1 wherein $R_4$ represents phenyl, o-halophenyl, 2,6-dihalophenyl or 2-pyridyl.

5. A compound of claim 1 wherein $R_2$ represents cyclopropylmethyl, diethylaminoethyl or methoxymethyl.

6. A compound of claim 1 wherein $R_1$ represents halogen or nitro, $R_2$ and $R_3$ each represents hydrogen or lower alkyl, and $R_4$ represents phenyl or halophenyl.

7. A compound of claim 6 wherein $R_4$ represents halophenyl.

8. A compound of claim 7 wherein the halophenyl group is an o-halophenyl group.

9. A compound of claim 8 wherein the o-halophenyl group is o-chlorophenyl or o-fluorophenyl.

10. A compound of claim 6 wherein $R_1$ represents chlorine or nitro.

11. A compound of claim 6 wherein $R_2$ represents hydrogen or methyl.

12. A compound of claim 6 wherein $R_3$ represents hydrogen or ethyl.

13. 11-chloro-12b-(o-fluorophenyl) - 8,12b-dihydro-8-methyl - 2H[1,3]oxazino[3,2-d][1,4]benzodiazepine - 2,4,7(3H,6H)-trione.

14. 3-ethyl-11-chloro-12b - (o-chlorophenyl)-8,12b-dihydro-8-methyl - 2H - [1,3]oxazino[3,2-d][1,4]benzodiazepine-2,4,7(3H,6H)-trione.

15. 3 - ethyl - 11-chloro-12b-(o-fluorophenyl)-8,12b-dihydro - 8 - methyl-2H-[1,3]oxazino[3,2-d][1,4]benzodiazepine-2,4,7(3H,6H)-trione.

16. A process for the preparation of a compound of the formula

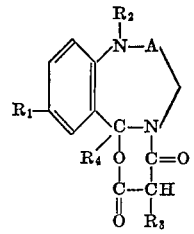

wherein
$R_1$ signifies hydrogen, halogen, nitro, trifluoromethyl, cyano, amino, lower alkanoyl, or lower alkyl containing from 2 to 4 carbon atoms;
$R_2$ signifies hydrogen, lower alkyl, lower alkoxy-lower alkyl, cycloalkyl-lower alkyl wherein the cycloalkyl moiety contains from 3 to 6 carbon atoms, or di-lower alkylamino-lower alkyl;
$R_3$ signifies hydrogen or lower alkyl;
$R_4$ signifies pyridyl, phenyl, mono-halophenyl or di-halophenyl;
X signifies —CO— or —CH$_2$—
which comprises reacting a compound of the formula

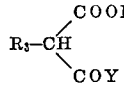

wherein
$R_3$ is as described above, and
COY represents a carboxyl group or "an acid halide group or an ester group"
with a compound of the formula

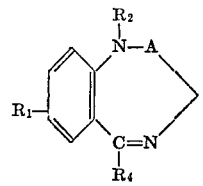

wherein $R_1$, $R_2$, $R_4$ and A are as described above.

References Cited
UNITED STATES PATENTS
3,573,282   3/1971   Szmuszkovicz ____ 260—239.3 T
3,575,965   4/1971   Szmuszkovicz ____ 260—239.3 T HENRY R. JILES, Primary Examiner
R. T. BOND, Assistant Examiner U.S. Cl. X.R.
260—244 R; 424—248